(12) United States Patent
Yamamoto et al.

(10) Patent No.: US 7,667,781 B2
(45) Date of Patent: Feb. 23, 2010

(54) PICTURE QUALITY ADJUSTING DEVICE AND A TELEVISION SET HAVING A PICTURE QUALITY ADJUSTING DEVICE

(75) Inventors: Naoki Yamamoto, Daito (JP); Kentaro Eto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 805 days.

(21) Appl. No.: 11/297,262

(22) Filed: Dec. 8, 2005

(65) Prior Publication Data
US 2006/0132656 A1 Jun. 22, 2006

(30) Foreign Application Priority Data
Dec. 21, 2004 (JP) .............................. 2004-369139

(51) Int. Cl.
| | | |
|---|---|---|
| H04N 5/44 | (2006.01) | |
| H04N 5/445 | (2006.01) | |
| H04N 5/50 | (2006.01) | |
| H04N 5/57 | (2006.01) | |
| H04N 9/64 | (2006.01) | |
| H04N 9/68 | (2006.01) | |
| H04N 9/73 | (2006.01) | |

(52) U.S. Cl. .................... 348/734; 348/553; 348/564; 348/569; 348/649; 348/655; 348/687; 348/645

(58) Field of Classification Search ................. 348/563, 348/564, 569, 734, 649, 655, 687, 645
See application file for complete search history.

(56) References Cited

U.S. PATENT DOCUMENTS

| | | | | |
|---|---|---|---|---|
| 5,434,626 A | * | 7/1995 | Hayashi et al. ............. | 348/569 |
| 5,598,523 A | * | 1/1997 | Fujita ......................... | 715/840 |
| 5,767,919 A | * | 6/1998 | Lee et al. ..................... | 725/37 |
| 5,774,187 A | * | 6/1998 | Tsunoda .................... | 348/553 |
| 5,781,247 A | * | 7/1998 | Wehmeyer et al. .......... | 348/569 |
| 5,831,664 A | * | 11/1998 | Wharton et al. .............. | 725/81 |
| 6,097,441 A | * | 8/2000 | Allport ........................ | 348/552 |
| 6,292,283 B1 | * | 9/2001 | Grandbois .................. | 398/107 |
| 6,407,779 B1 | * | 6/2002 | Herz ........................... | 348/734 |

(Continued)

FOREIGN PATENT DOCUMENTS

JP 11-196286 7/1999

OTHER PUBLICATIONS

Patent Abstracts of Japan, Publication No. 11-196286, dated Jul. 21, 1999 (1 page).

Primary Examiner—Brian P Yenke
(74) Attorney, Agent, or Firm—Osha • Liang LLP (57) ABSTRACT

A television set carries out communications with a remote control. When the television set displays a picture based on a picture signal subjected to quality adjustment, a signal level of a quality adjustment parameter is obtained, and the data indicating the obtained signal level is transmitted to the remote control. The remote control displays the received data. The user checks the displayed data, and enters data for changing the signal level so that the remote control transmits the entered data to the television set. The television set receives the changed level data, and adjusts the quality relating to the picture signal based on the received level data. The television set displays the picture of the quality adjusted according to the signal level changed by the user.

7 Claims, 5 Drawing Sheets

U.S. PATENT DOCUMENTS

| | | | |
|---|---|---|---|
| 6,496,122 B2 * | 12/2002 | Sampsell | 340/825.69 |
| 6,530,083 B1 * | 3/2003 | Liebenow | 725/46 |
| 6,532,592 B1 * | 3/2003 | Shintani et al. | 725/141 |
| 6,862,741 B1 * | 3/2005 | Grooters | 725/39 |
| RE39,059 E * | 4/2006 | Foster | 715/744 |
| 7,109,974 B2 * | 9/2006 | Kempisty | 345/173 |
| 7,360,232 B2 * | 4/2008 | Mitchell | 725/112 |
| 2002/0083449 A1 * | 6/2002 | Im | 725/39 |
| 2003/0103165 A1 * | 6/2003 | Bullinger et al. | 348/569 |
| 2003/0164818 A1 * | 9/2003 | Miller-Smith | 345/173 |
| 2003/0169234 A1 * | 9/2003 | Kempisty | 345/158 |
| 2006/0215987 A1 * | 9/2006 | Horentrup et al. | 386/83 |

\* cited by examiner

PICTURE QUALITY ADJUSTING DEVICE AND A TELEVISION SET HAVING A PICTURE QUALITY ADJUSTING DEVICE

BACKGROUND OF THE INVENTION

1. Field of the Invention

The present invention relates to a picture quality adjusting device and a television set having a picture quality adjusting device, and particularly to a picture quality adjusting device for adjusting a picture quality of a television set or the like by a remote control operation as well as the television set having the picture quality adjusting device.

2. Description of the Background Art

In television sets and projectors, values of related various parameters can be changed. It has been proposed to perform adjustment of various parameter values related to a television set via a remote control of the television set.

For example, in Japanese Patent Laying-Open No. 11-196286 has proposed a technique relating to a television set including two receiving and tuning circuits, and particularly a technique in which bidirectional communications are performed between the television set and a remote control having a display screen so that a user can perform channel setting of the television set on the display screen of the remote control. In this case, selected pictures and sounds are transmitted from the television set to the remote control.

Figure 7:
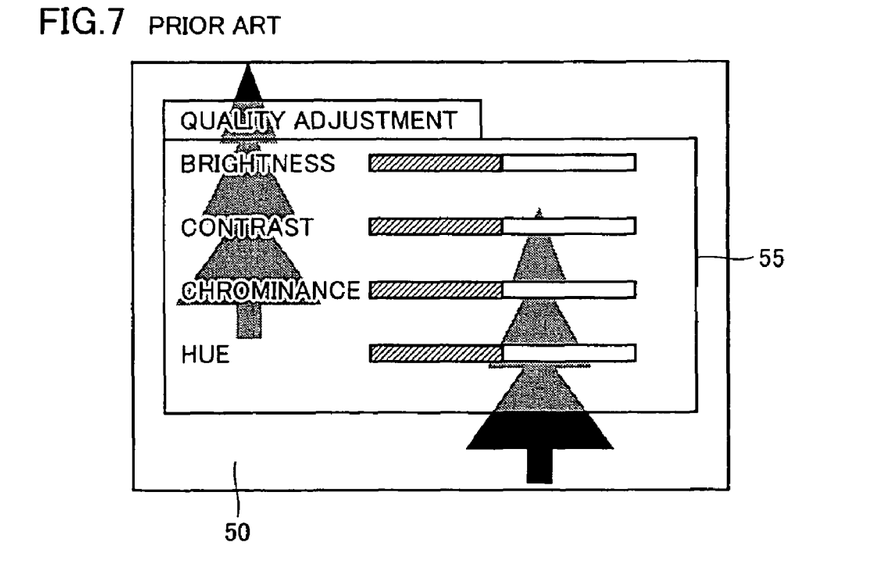
FIG. 7 shows an example of conventional display during quality adjustment.

Parameters related to the television set include parameters for adjusting a picture quality in addition to parameters relating to receiving channel. Usually, parameter values for adjusting the picture quality are displayed on the television set as shown in FIG. 7. In FIG. 7, a quality adjusting picture 55 displayed by OSD (On Screen Display) overlaps with an actual picture 50. A user adjusts parameters by operating a remote control while viewing actual picture 50. However, it is not easy to determine adjustment amounts for the appropriate picture quality due to quality adjusting picture 55 overlapping with picture 50.

In view of this, it is desired that the parameter values for quality adjustment are output (displayed) on the remote control instead of the television set. In Japanese Patent Laying-Open No. 11-196286, however, the bidirectional communications between the remote control and the television set can be performed only for the pictures and sounds, and cannot be performed for transmitting parameters values for the quality adjustment so that the foregoing problem cannot be overcome.

SUMMARY OF THE INVENTION

Accordingly, an object of the invention is to provide a picture quality adjusting device which allows easy operations of changing parameters for adjusting a quality of a displayed picture as well as easy checking of changes in picture quality caused by the changing operations, and is also to provide a television set having a picture quality adjusting device.

For achieving the above object, a picture quality adjusting device according to an aspect of the invention includes a picture output unit and a remote control unit to be operated for remote controlling of the picture output unit, and is configured as follows for adjusting a quality of the displayed picture.

The picture output unit includes a picture processing unit performing picture signal processing including quality adjustment based on a provided signal of a quality adjustment parameter, a display unit displaying a picture based on a picture signal processed by the picture processing unit, an adjustment level obtaining unit obtaining a signal level of the quality adjustment parameter for the quality adjustment, an output-side transmitting unit transmitting level data indicating the signal level of the quality adjustment parameter obtained from the adjustment level obtaining unit to the remote control unit, and an adjustment signal supply unit providing a signal of the quality adjustment parameter at the signal level indicated by the level data received from the remote control unit to the picture processing unit.

The remote control unit includes an operation-side display unit, a level data display unit receiving the level data transmitted from the output-side transmitting unit and displaying the level data on the operation-side display unit, a level data input unit inputting the level data according to an external operation, and an operation-side transmitting unit transmitting the level data provided from the level data input unit to the picture output unit.

Accordingly, when the picture is being displayed based on the picture signal subjected to the picture signal processing including the quality adjustment, the signal level of the quality adjustment parameter is obtained, and the level data indicating the obtained signal level is transmitted to the remote control unit, and is displayed on the operation-side display unit. The level data provided by an external operation via the level data input unit of the remote control unit is transmitted to the picture output unit, which displays the picture of the quality adjusted based on the signal of the quality adjustment parameter at the signal level indicated by the level data.

According to the invention, the external operation is performed to enter and change the level data via the level data input unit while displaying the level of the quality adjustment parameter, and the picture output unit displays the picture of the quality which is adjusted based on the changed level data. In this operation, the level of the quality adjustment parameter is displayed by the remote control display unit independent of the picture display unit displaying the picture. Therefore, the level display of the quality adjustment parameter does not block the display of the picture of the adjusted quality so that a user can easily perform the operation of changing the value of the parameter for adjusting the quality of the displayed picture as well as the operation of checking the changes in picture quality caused by the changing of the parameter value.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings.

The invention can be applied to devices that can adjust qualities of pictures (images) displayed thereby, and the embodiment relates a television set as an example of such devices. However, the invention is not restricted to it, and may be applied to other devices such as a projector.

In this embodiment, four kinds of parameters, i.e., "brightness", "contrast", "chrominance" and "hue" are handled as quality adjustment parameters. However, the quality adjustment parameters are not restricted to these four parameters, and the number of kinds of the quality adjustment parameters is required merely to be one or more, and is not restricted to four.

Figure 1A:
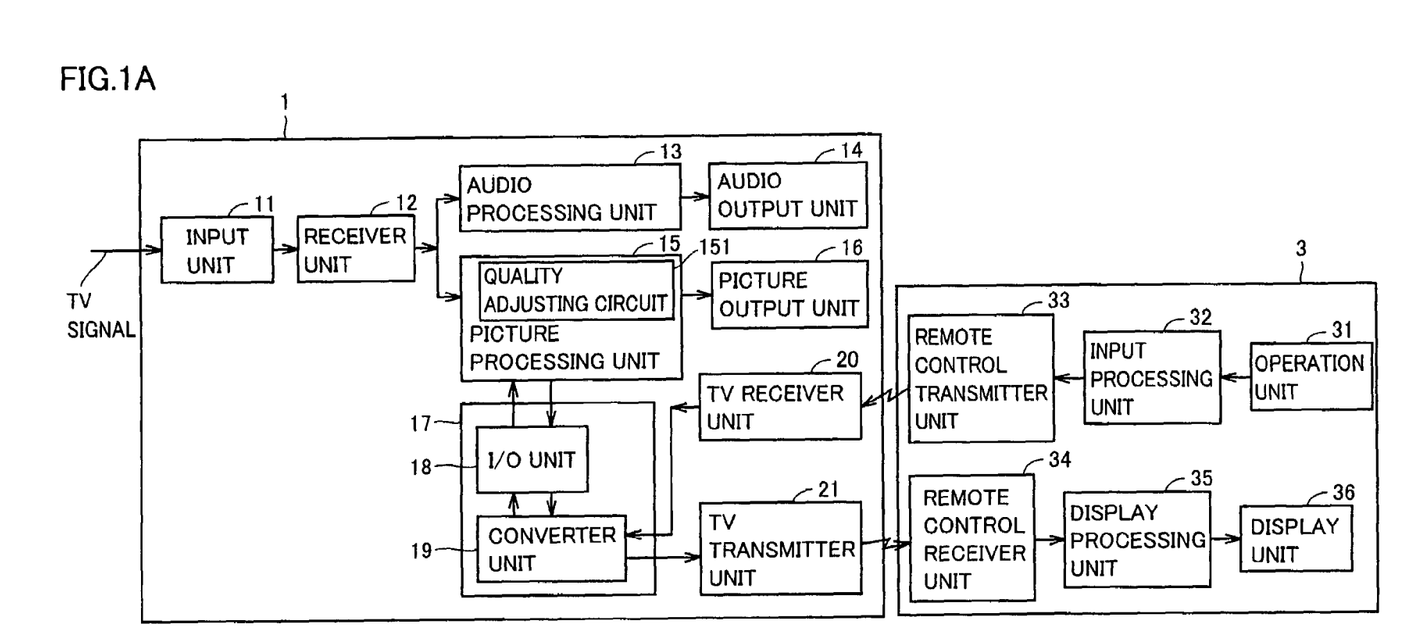
FIGS. 1A and 1B show internal block structures and outer appearances of a television set and a remote control according to an embodiment of the invention.

Referring to FIG. 1A, bidirectional communications are performed between a television set 1 and a remote control 3 remotely controlling television set 1. Television set 1 includes an input unit 11, a receiver unit 12, an audio processing unit 13, an audio output unit 14, a picture processing unit 15, a picture output unit 16, a control unit 17, a TV receiver unit 20 (i.e., receiver unit 20 on the TV side) and a TV transmitter unit 21 (i.e., transmitter unit 21 on the TV side). Input unit 11 is formed of, e.g., a terminal for inputting a TV signal received by an antenna (not show). Receiver unit 12 performs operations such as a tuning operation for taking out only a signal for a desired channel from TV signals input through input unit 11. Audio processing unit 13 demodulates and outputs the audio signal modulated with an audio sub-carrier in the TV signal taken out by receiver unit 12. Audio output unit 14 receives the audio signal provided from audio processing unit 13, and provides a television sound. Picture processing unit 15 performs various kinds of picture signal processing such as color demodulation on the TV signal provided from receiver unit 12, and separates a synchronous signal from the received TV signal to provide a picture (image) via picture output unit 16. Control unit 17 controls TV receiver unit 20 and TV transmitter unit 21 for communications with remote control 3 as well as other units and portions.

TV receiver unit 20 demodulates the signal received from remote control 3, and provides data obtained by this demodulation to control unit 17. TV transmitter unit 21 modulates data provided from control unit 17, and transmits it to remote control 3.

Control unit 17 has a converter unit 19 having a function of a simple microcomputer as well as an input/output unit 18. Input/output unit 18 transmits signals between converter unit 19 and picture processing unit 15.

It is assumed that picture processing unit 15 has a circuit 151 for adjusting picture qualities such as brightness, contrast, chrominance and hue of the picture based on the picture signal for the picture signal output by picture output unit 16.

Figure 1B:
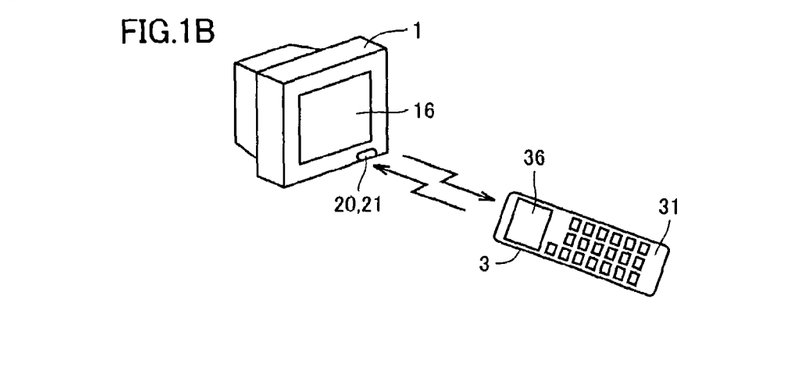

Remote control 3 has an operation unit 31 which can be externally operated by a user for entering various kinds of information such as instructions, an input processing unit 32 which accepts data or the like entered by the operation of operation unit 31, and performs processing, e.g., of producing a remote control code based on the accepted data or the like, a remote control transmitter unit 33 (i.e., transmitter unit 33 on the remote control side) which modulates and transmits the remote control code provided from input processing unit 32, a remote control receiver unit 34 (i.e., receiver unit 34 on the remote control side) receiving and demodulating the signal of the remote control code transmitted from television set 1 and a display processing unit 35 which processes the remote control code demodulated by remote control receiver unit 34, and displays the data based on a result of the processing on a display unit 36. Display unit 36 is formed of, e.g., a liquid crystal display. FIG. 1B shows outer appearances of television set 1 and remote control 3.

Although it is assumed in this embodiment that remote control 3 and television set 1 perform the communications by infrared rays, the communications may be performed by electromagnetic rays.

Figure 2:
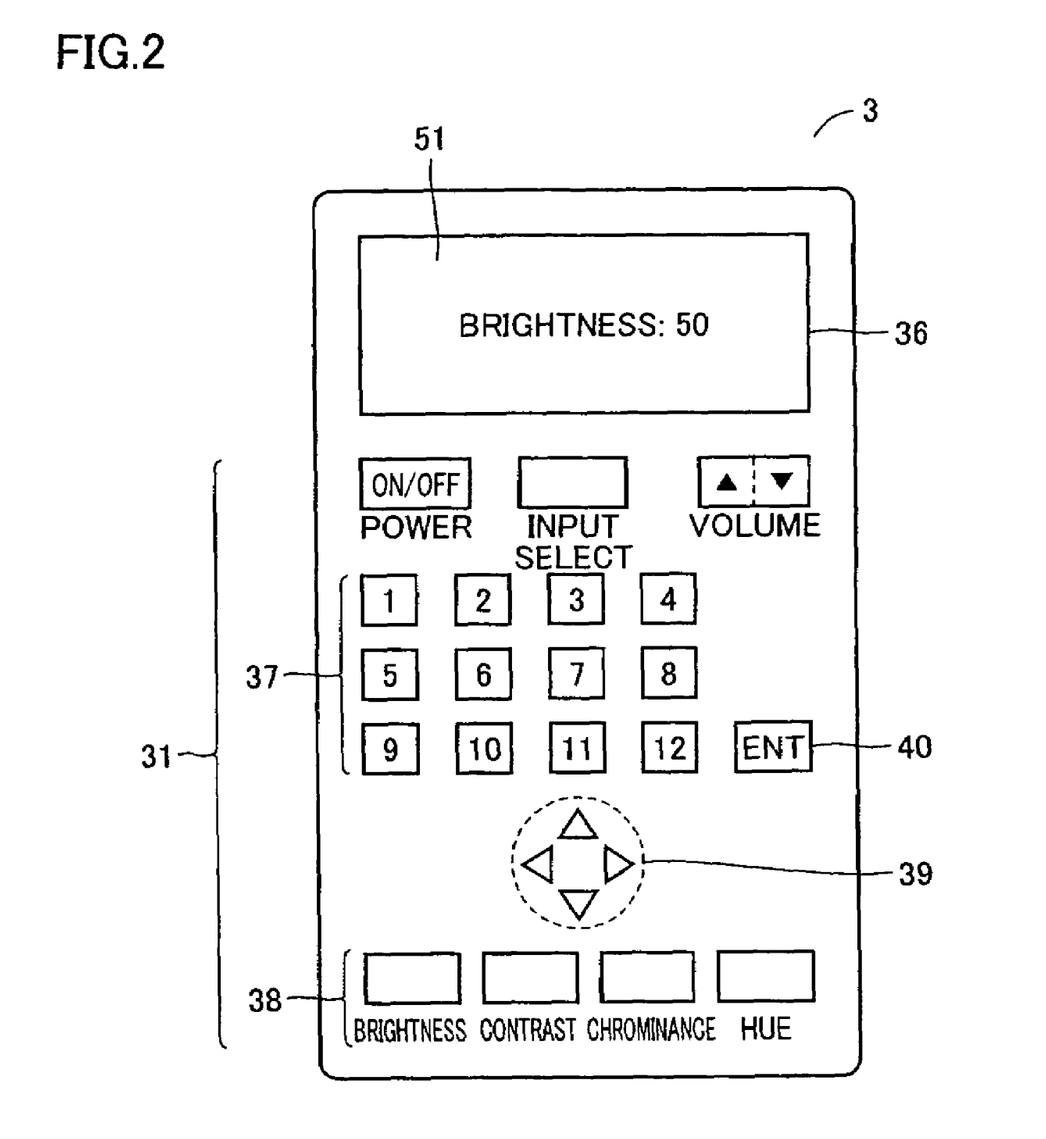
FIG. 2 shows an operation panel surface of the remote control according to the embodiment of the invention.

FIG. 2 shows an operation panel surface of remote control 3. Display unit 36 and operation unit 31 are provided at the operation panel surface so that a user can check displayed contents while operating remote control 3. Operation unit 31 is provided with a button for turning on/off a power of television set 1, a button for selecting an input of television set 1, a button for controlling a sound volume, a numeric keypad 37 to be used for selecting a channel and entering various kinds of information, a quality adjusting key group 38 to be operated for adjusting a quality, a cursor key group 39 and an enter key 40 to be operated for deciding details of operations or selection. When adjusting the quality, display unit 36 displays a quality adjusting picture 51, i.e., picture for adjusting the quality.

Quality adjusting key group 38 includes various keys for selecting the foregoing four kinds of parameters as the quality adjustment parameter, respectively. Cursor key group 39 is operated for moving a cursor (not shown) displayed on the display screen of picture output unit 16 of television set 1.

Figure 3:
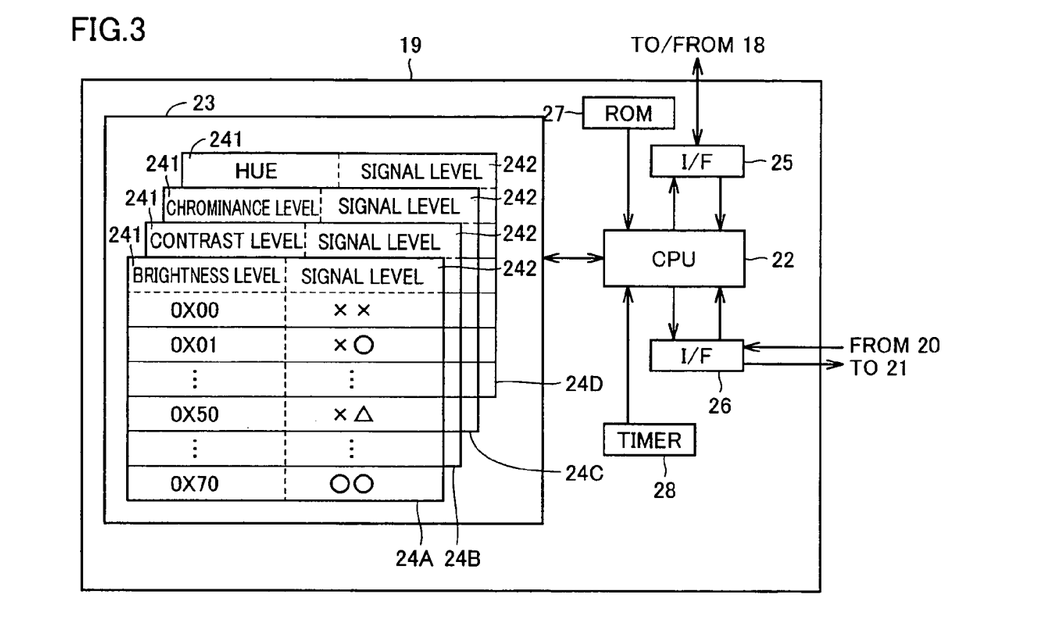
FIG. 3 shows an internal block of a converter unit of the television set according to the embodiment of the invention.

FIG. 3 shows an internal structure of converter unit 19 of television set 1. Converter unit 19 includes a CPU (Central Processing Unit) 22, a memory 23, an interface unit 25 for transmission and reception to and from input/output unit 18, an interface unit 26 for transmission to TV receiver unit 20 and reception from TV transmitter unit 21, a ROM (Read Only Memory) 27 for storing programs and data, and a timer 28 for measuring a time to provide measured time data to CPU 22.

Memory 23 has prestored conversion tables 24A-24D corresponding to the foregoing four kinds of parameters for the quality adjustment, respectively. Each of conversion tables 24A-24D has stored signal level data 242 corresponding to a plurality of relative level data 241 of the corresponding parameter. Relative level data 241 is data used for transmission and reception to and from remote control 3. Signal level data 242 indicates a signal level (voltage value, current value or the like) for adjustment which is applied to quality adjusting circuit 151 of picture processing unit 15 for displaying the picture of the quality at the level indicated by relative level data 241 by picture output unit 16.

When the adjustment parameter relates to, e.g., the "brightness", conversion table 24A for it stores the brightness level data as relative level data 241. The brightness level data represents the relative brightness, and indicates a value between 1 and 100 inclusive obtained by converting the signal level for brightness adjustment supplied from quality adjusting circuit 151 assuming that the signal level for brightness adjustment of quality adjusting circuit 151 of picture processing unit 15 may take the maximum level Max (mV) of 100 and the minimum level Min (mV) of 1.

The same is true with respect to conversion tables 24B, 24C and 24D of the "contrast", "chrominance" and "hue". Thus, conversion tables 24B, 24C and 24D store, as relative level data 241, the contrast level data, chrominance level data and hue level data thus obtained by the conversion corresponding to signal level data 242 for adjustment of quality adjusting circuit 151 (for contrast adjustment, chrominance adjustment and hue adjustment) in picture processing unit 15, respectively.

Figures 4A, 4B, 4C:
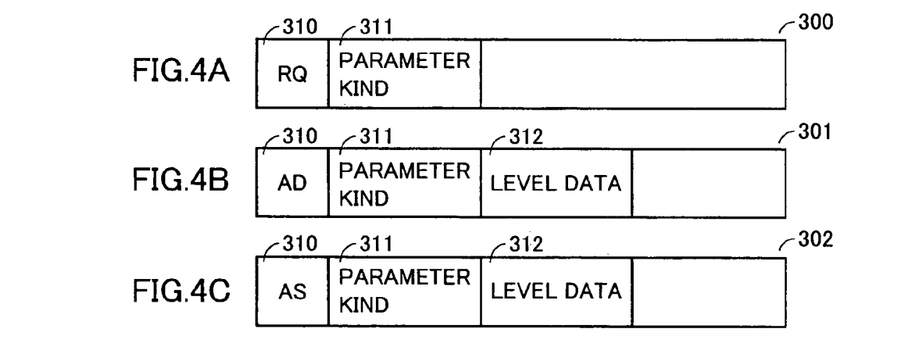
FIGS. 4A-4C illustrate remote control codes transmitted and received according to the embodiment of the invention.

FIGS. 4A-4C illustrate examples of details of remote control codes 300-302 which are transmitted to and received from television set 1 and remote control 3. When remote control 3 transmits to television set 1 a request for obtaining a current level of a certain kind of quality adjusting parameter, remote control 3 transmits remote control code 300 in FIG. 4A. Remote control code 300 in FIG. 4A includes a header 310 of "RQ" indicating a request for obtaining data, and a code 311 specifying the kind of the parameter of the requested current level.

Remote control 3 also transmits remote control code 301 in FIG. 4B. Remote control code 301 in FIG. 4B includes header 310 of "AD" indicating that this remote control code is a code for transmitting the parameter level for quality adjustment, code 311 specifying the kind of the parameter of the transmitted level data and code 312 representing the level data of the parameter of the kind specified by code 311.

Remote control code 302 in FIG. 4C is transmitted from television set 1 to remote control 3. This remote control code 302 is a return code to remote control code 300 for request in FIG. 4A. Therefore, it contains header 310 of "AS" indicating that this code is a return code, code 311 specifying the kind of the parameter of the requested (and thus returned) level data and code 312 representing the level data of the parameter specified by the kind specified by code 311.

According to the flowchart of FIG. 5, description will now be given on the steps of adjusting the picture quality of television set 1 with remote control 3. It is assumed that the user adjusts the brightness while the user is watching the picture displayed on picture output unit 16 of television set 1. The kind of parameter to be adjusted is not restricted to the brightness.

First, the user operates the key of "brightness" in quality adjusting key group 38 on remote control 3 while watching the displayed picture (YES in step S21). When this operation is performed, input processing unit 32 produces remote control code 300 in FIG. 4A according to the operated key, and provides remote control code 300 thus produced to remote control transmitter unit 33, which performs infrared ray modulation on received remote control code 300, and transmits it (step S23).

In television set 1, when TV receiver unit 20 receives remote control code 300 from remote control 3, it demodulates received remote control code 300 to provide it to converter unit 19. CPU 22 in converter unit 19 receives the remote control code provided from TV receiver unit 20 via interface unit 26. From remote control code 300 thus received, it is determined whether header 310 indicates "RQ" or not, and thus whether remote control code 300 requesting the level data of the quality adjustment parameter in FIG. 4A is input or not (step S1).

When it is determined from a result of the determination that header 310 does not indicate "RQ" (NO in step S1), the process proceeds to step S9 which will be described later.

Conversely, when the header indicates "RQ" (YES in step S1), CPU 22 detects the current signal level of the parameter of the requested kind which is indicated by code 311 of provided remote control code 300 (step S3).

Thus, CPU 22 obtains the signal level supplied for adjusting the brightness which is the parameter of the kind requested for quality adjusting circuit 151 of picture processing unit 15 via interface unit 25 and input/output unit 18.

Then, CPU 22 searches brightness conversion table 24A in memory 23 for signal level data 242 based on the obtained signal level for the brightness adjustment, and reads the brightness level data which is relative level data 241 corresponding to signal level data 242 indicating the obtained signal level (step S5). Thereby, the level of the brightness adjusting signal (voltage signal or current signal) of quality adjusting circuit 151 is converted into relative brightness level data.

Then, CPU 22 produces remote control code 302 in FIG. 4C including the brightness level data which is converted (i.e., read) relative level data 241, the data relating to the parameter kind and indicating that the data is the brightness parameter data and the header of "AS", and provides it to TV transmitter unit 21 via interface unit 26 so that TV transmitter unit 21 modulates and transmits remote control code 302 in FIG. 4C thus provided (step S7). Thereafter, CPU 22 enters a waiting state.

In remote control 3, remote control receiver unit 34 receives remote control code 302 in FIG. 4C transmitted in step S7 from television set 1 (YES in step S25), and provides it to display processing unit 35 after demodulating it. Therefore, based on the details of the provided remote control code, display processing unit 35 causes display unit 36 to display quality adjusting picture 51, e.g., "BRIGHTNESS: 50" as shown in FIG. 2 (step S27).

The user checks quality adjusting picture 51 displayed on display unit 36 of remote control 3 in user's hand, and operates numeric keypad 37 to enter a desired value for changing the brightness. When enter key 40 is operated after entering the intended value through numeric keypad 37, input processing unit 32 receives the contents of the operation from operation unit 31 (step S29), and produces remote control code 301 in FIG. 4B based on the received contents to provide it to remote control transmitter unit 33 so that remote control transmitter unit 33 modulates and transmits remote control code 301 provided thereto (step S31). Remote control 3 may be configured to display the value entered through numeric keypad 37 on display unit 36.

In television set 1, TV receiver unit 20 receives remote control code 301 from remote control 3, and provides it to converter unit 19 after demodulating it so that CPU 22 is released from the standby state, and receives remote control code 301 to determine whether header 310 in received remote control code 301 is "AD" or not (step S9). When it is determined that header 310 is not "AD", the series of processing ends. Although the processing ends in the above description when header 310 is not "AD", control unit 17 may be configured to start another processing (not illustrated) according to the received remote control code.

When header 310 is "AD", i.e., when it is determined that the level data provided from remote control 3 is received (YES in step S9), CPU 22 produces a remote control code of a message indicating reception of remote control code 301, and transmits it via interface unit 26 and TV transmitter unit 21 (step S10). Remote control receiver unit 34 in remote control 3 receives this remote control code (YES in step S33), and the message indicated by the received remote control code is displayed on display unit 36 via display processing unit 35 (step S35). As described above, CPU 22 has a message transmitting unit which produces the remote control code of the above message, and transmits it via TV transmitter unit 21. Remote control 3 has a message display unit which receives the remote control code and displays the above message. This message display unit is formed of remote control receiver unit 34, display processing unit 35 and display unit 36.

Then, CPU 22 searches conversion table 24A of the parameter corresponding to the brightness, i.e., the kind indicated by code 311 of received remote control code 301 based on the level data indicated by code 312 of remote control code 301, and reads corresponding signal level data 242 (step S11).

The signal for brightness adjustment at the level indicated by signal level data 242 thus read is provided to quality adjusting circuit 151 of picture processing unit 15 via input/output unit 18 under the control of CPU 22 according to the remote control code so that quality adjusting circuit operates based on the level of the signal thus provided. Consequently, the brightness of picture displayed on picture output unit 16 is adjusted (changed) (step S13).

After checking the quality of the picture displayed on picture output unit 16 at the adjusted brightness level, the user may wish to adjust the brightness again, in which case the user operates remote control 3 to repeat the processing in and after step S21 by remote control 3 and to repeat the processing in and after step S1 by television set 1 in similar manners.

Figure 5:
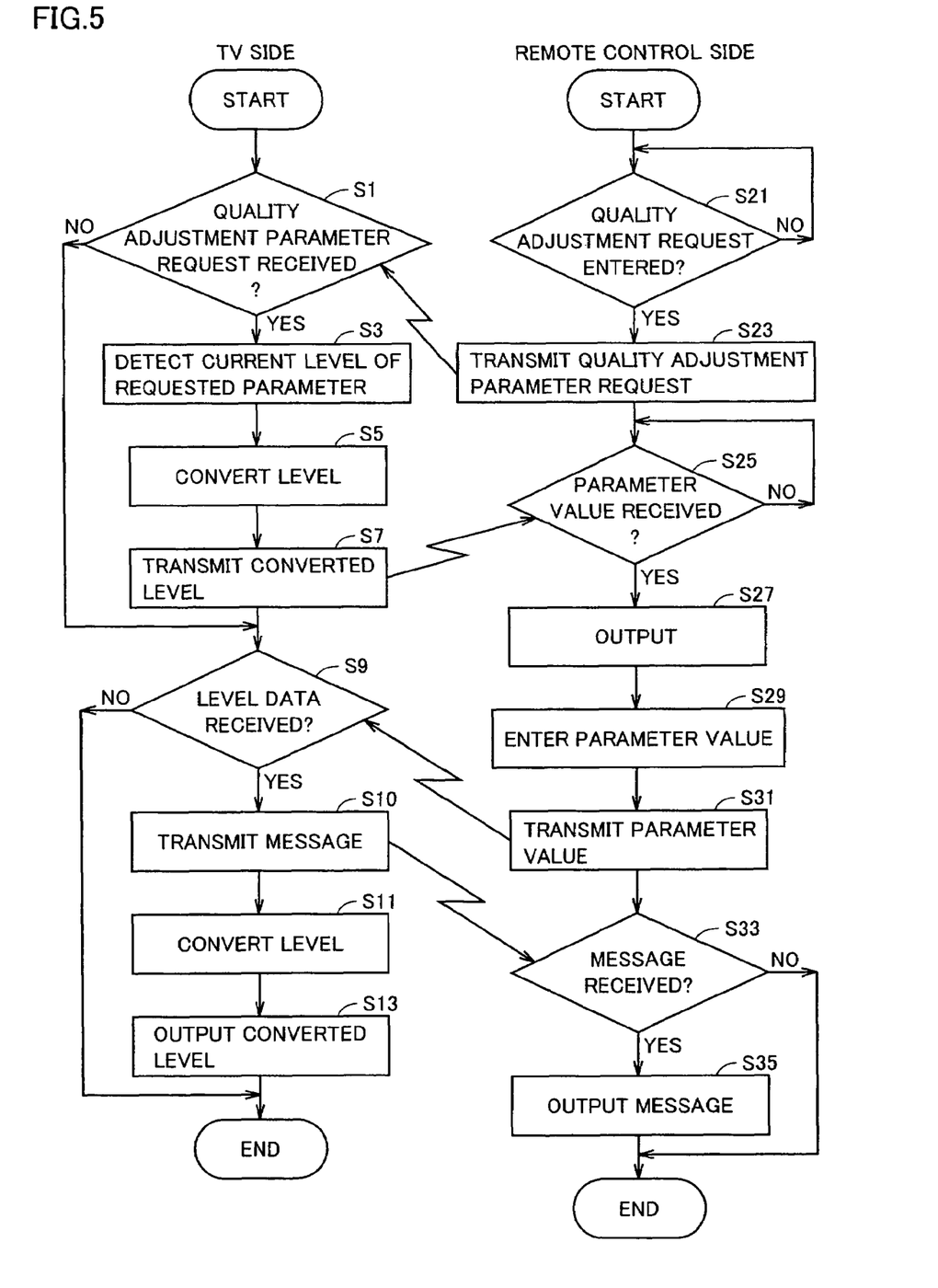
FIG. 5 is a flowchart illustrating processing steps according to the embodiment of the invention.
Figure 6:
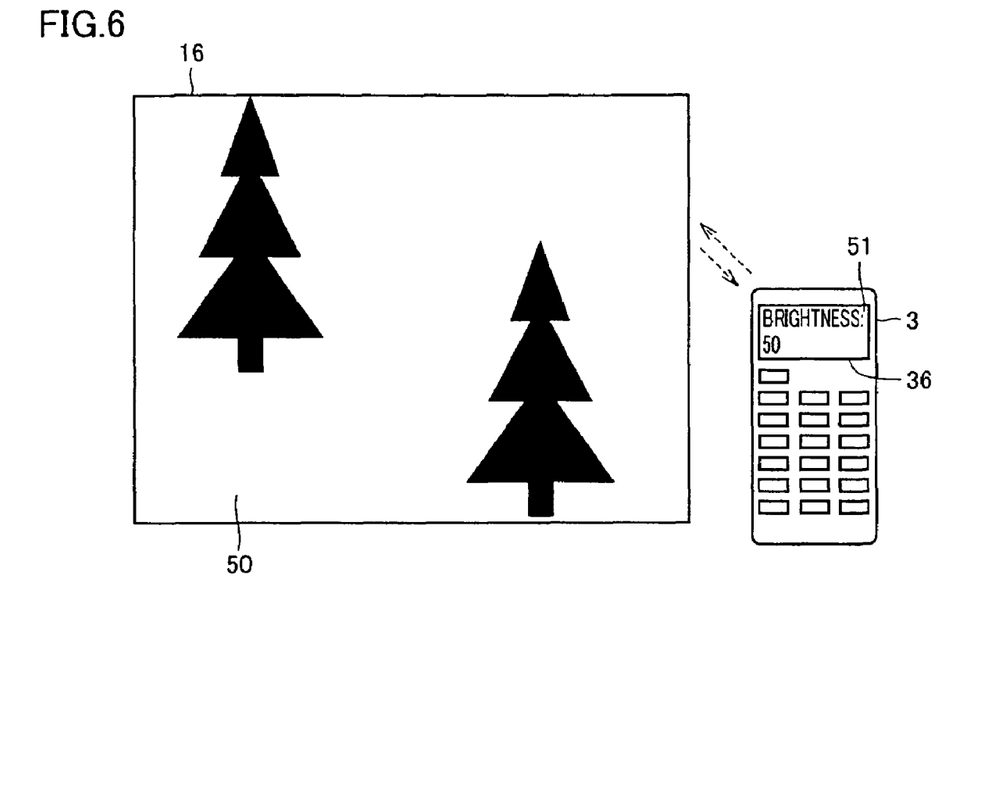
FIG. 6 shows an example of display during quality adjustment according to the embodiment of the invention.

During the quality adjusting operation described above, picture output unit 16 displays the picture as shown in FIG. 6 in step S13. On the picture shown in FIG. 6, conventional quality adjusting picture 55 in FIG. 7 is not superimposed so that the user can adjust the picture quality while fully viewing actual picture 50. Therefore, the user can easily perform both the parameter changing operation and the operation of checking the change in quality (brightness) caused according to the change in parameter.

(Modification)

In step S10 shown in FIG. 5, television set 1 transmits to remote control 3 the message to the effect that remote control code 301 for quality adjustment was received, and remote control 3 displays this message so that the user reading the displayed message can recognize that the quality adjustment was performed in television set 1. The transmission of this message and the display thereof on remote control 3 may be performed after step S13 in FIG. 5.

In the above embodiment, the level conversion is performed by referring to conversion tables 24A-24D. However, formulas for conversion may be prepared, and CPU 22 may have a function as a calculating unit which performs calculation according to the formulas for the conversion.

In step S9 illustrated in FIG. 5, CPU 22 stops the standby state when it receives the remote control code from remote control 3. Alternatively, the following manner may be employed. Timer 28 in FIG. 28 measures the time from the completion of transmission in step S7, and the processing will be continued by stopping the wait state when the remote control code can be received within a predetermined time. When the remote control code cannot be received from remote control 3 within the predetermined time, a message that the quality adjusting mode is released is transmitted to remote control 3, and is displayed thereon, and television set 1 stops the series of processing in FIG. 5.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television set comprising:
a picture quality adjusting device configured to adjust a quality of a displayed picture,
wherein said picture quality adjusting device includes:
a picture output unit, and
a remote control unit configured to remotely control the picture output unit;
wherein said picture output unit includes:
picture processing means for performing picture signal processing including quality adjustment based on a provided signal of a quality adjustment parameter,
display means for displaying a picture based on a picture signal processed by said picture processing means,
adjustment level obtaining means for obtaining a signal level of said quality adjustment parameter for said quality adjustment,
output-side transmitting means for transmitting level data indicating the signal level of said quality adjustment parameter obtained from said adjustment level obtaining means to said remote control unit, and
adjustment signal supply means for providing a signal of said quality adjustment parameter at the signal level indicated by said level data received from said remote control unit to said picture processing means;
wherein said remote control unit includes:
operation-side display means,
level data display means for receiving said level data transmitted from said output-side transmitting means and displaying said level data on said operation-side display means,
level data input means for inputting said level data according to an external operation, and
operation-side transmitting means for transmitting said level data provided from said level data input means to said picture output unit;
wherein said level data is data indicating a relative level of said signal of said quality adjusting parameter;
wherein said output-side transmitting means has means for converting the signal level of said obtained quality adjusting parameter to said level data indicating said relative level;
wherein said adjustment signal supply means has means for converting said received level data to the signal level of said quality adjustment parameter indicated by said level data;
wherein said picture output unit further has message transmitting means for transmitting data of a predetermined message to said remote control unit when said level data is received from said remote control unit;
wherein said remote control unit further has message display means for receiving the data of said predetermined message transmitted from said message transmitting means, and displaying said predetermined message on said operation-side display means;
wherein said adjustment level obtaining means has obtainment request receiving means for receiving an obtainment request for the signal level of said desired quality adjustment parameter, and obtains the signal level of said desired quality adjustment parameter received by said obtainment request receiving means; and
wherein said remote control unit further includes obtainment request transmitting means for transmitting the obtainment request for said signal level relating to said desired quality adjustment parameter designated according to an external operation.

2. A picture quality adjusting device configured to adjust a quality of a displayed picture, comprising:
a picture output unit, and
a remote control unit configured to remotely control the picture output unit,
wherein said picture output unit includes:
picture processing means for performing picture signal processing including quality adjustment based on a provided signal of a quality adjustment parameter, display means for displaying a picture based on a picture signal processed by said picture processing means, adjustment level obtaining means for obtaining a signal level of said quality adjustment parameter for said quality adjustment, output-side transmitting means for transmitting level data indicating the signal level of said quality adjustment parameter obtained from said adjustment level obtaining means to said remote control unit, and adjustment signal supply means for providing a signal of said quality adjustment parameter at the signal level indicated by said level data received from said remote control unit to said picture processing means;

wherein said remote control unit includes:

operation-side display means, level data display means for receiving said level data transmitted from said output-side transmitting means and displaying received said level data on said operation-side display means, level data input means for inputting said level data according to an external operation, and operation-side transmitting means for transmitting said level data provided from said level data input means to said picture output unit;

wherein said adjustment level obtaining means has obtainment request receiving means for receiving an obtainment request for the signal level of said desired quality adjustment parameter, and obtains the signal level of said desired quality adjustment parameter received by said obtainment request receiving means;

wherein said remote control unit further includes obtainment request transmitting means for transmitting the obtainment request for said signal level relating to said desired quality adjustment parameter designated according to an external operation.

3. The picture quality adjusting device according to claim 2, wherein said level data is data indicating a relative level of said quality adjusting signal, said output-side transmitting means has first converting means for converting the signal level of said obtained quality adjusting parameter to said level data indicating said relative level, and said adjustment signal supply means has second converting means for converting said received level data to the signal level of said quality adjustment parameter indicated by said level data.

4. The picture quality adjusting device according to claim 3, further comprising:

a table storing a plurality of said level data and the signal levels of said quality adjustment parameters respectively corresponding to said plurality of level data, wherein said first converting means searches said table based on the signal level of said obtained quality adjustment parameter, and reads the corresponding level data, and said second converting means searches said table based on said received level data, and reads the signal level of said corresponding quality adjustment parameter.

5. The picture quality adjusting device according to claim 3, wherein said first converting means calculates said level data based on the signal level of said obtained quality adjustment parameter, and said second converting means calculates the signal level of said quality adjustment parameter based on said received level data.

6. The picture quality adjusting device according to claim 2, wherein said image output means further has message transmitting means for transmitting data of a predetermined message to said remote control unit when said level data is received from said remote control unit; and said remote control unit further has message display means for receiving the data of said predetermined message transmitted from said message transmitting means, and displaying said predetermined message on said operation-side display means.

7. The picture quality adjusting device according to claim 2, wherein said image output unit is a television set.

* * * * *